(12) United States Patent
Tabatabaee et al.

(10) Patent No.: US 9,166,919 B2
(45) Date of Patent: Oct. 20, 2015

(54) REDUCING HEADROOM

(75) Inventors: Vahid Tabatabaee, Cupertino, CA (US); Bruce Kwan, Sunnyvale, CA (US)

(73) Assignee: BROADCOM CORPORATION, Irvine, CA (US)

( * ) Notice: Subject to any disclaimer, the term of this patent is extended or adjusted under 35 U.S.C. 154(b) by 708 days.

(21) Appl. No.: 13/428,606

(22) Filed: Mar. 23, 2012

(65) Prior Publication Data
US 2013/0250757 A1    Sep. 26, 2013

(51) Int. Cl.
*H04L 12/825*    (2013.01)
*H04L 12/801*    (2013.01)
*H04L 12/835*    (2013.01)

(52) U.S. Cl.
CPC .............. *H04L 47/266* (2013.01); *H04L 47/29* (2013.01); *H04L 47/30* (2013.01)

(58) Field of Classification Search
CPC ......... H04L 47/10; H04L 47/30; H04L 47/15; H04L 47/90; H04L 49/90; H04L 49/30
See application file for complete search history.

(56) References Cited

U.S. PATENT DOCUMENTS

| | | | |
|---|---|---|---|
| 6,556,578 B1 * | 4/2003 | Silberschatz et al. | 370/412 |
| 7,606,158 B2 * | 10/2009 | Fedorkow et al. | 370/235 |
| 7,948,880 B2 | 5/2011 | Kwan et al. | |
| 2003/0172220 A1 | 9/2003 | Hao | |
| 2003/0223362 A1 * | 12/2003 | Mathews et al. | 370/230 |
| 2006/0092837 A1 | 5/2006 | Kwan et al. | |
| 2013/0250762 A1 * | 9/2013 | Assarpour | 370/235 |

FOREIGN PATENT DOCUMENTS

TW    201006180    2/2010

OTHER PUBLICATIONS

Office Action issued Mar. 17, 2014 in Korean Patent Application No. 10-2013-0030718.
Taiwanese Office Action issued Jun. 16, 2014 in Patent Application No. 101147572 (5 pages).
European Search Report in co-pending, related European Patent Application No. 12008553.5, mailed Jul. 12, 2013.
Office Action issued Aug. 31, 2015, in Chinese Patent Application No. 201210593577.9.

* cited by examiner

*Primary Examiner* — Kwang B Yao
*Assistant Examiner* — Hien Nguyen
(74) *Attorney, Agent, or Firm* — Oblon, McClelland, Maier & Neustadt, L.L.P.

(57) ABSTRACT

The various embodiments of the invention provide mechanisms to reduce headroom size while minimizing dropped packets. In general, this is done by using a shared headroom space between all ports, and providing a randomized delay in transmitting a flow-control message.

15 Claims, 4 Drawing Sheets

REDUCING HEADROOM

BACKGROUND

In packet-switching networks, switches have buffers that facilitate lossless operation. However, when incoming packet rates from a source are high, and data accumulates within the buffer, packets can be dropped due to exceeding the buffer size. Insofar as dropped packets are problematic for packet-switching networks, there are ongoing developments that attempt to ameliorate the problem of dropped packets.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
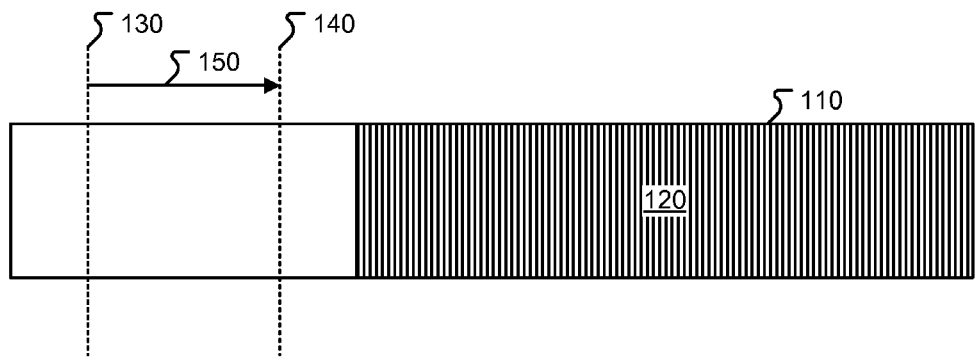
FIG. 1 is a diagram of one embodiment of a buffer having a randomized flow-control threshold.

In packet-switching networks, switches have buffers that facilitate lossless operation. However, when incoming packet rates from a source are high, and data accumulates within the buffer, packets can be dropped due to exceeding the buffer size. To ameliorate this problem, an Ethernet switch sends a link-level flow-control message when the data buffer usage of a particular queue or ingress port and priority exceeds a specified threshold, called an XOFF threshold. This flow-control message is sent to the source to instruct the source to stop transmitting packets. Due to delays in receiving the flow-control message by the source, the switch can still receive frames from the source, even after transmitting the XOFF message. In view of this delay, a portion of the switch buffer is normally reserved and provisioned to admit the packets that may arrive after the flow-control is set. This reserved buffer is referred to as the lossless headroom, or, simply, headroom.

One of the main reasons for this delay, and one of the main drivers in provisioning the headroom, is the waiting time in the switch for sending out the XOFF signal. Upon detection of congestion in the switch, a XOFF message is generated. However, if the port is already occupied with sending a packet, then the XOFF message cannot be sent until transmission of the current outgoing packet is finished. In the worst case, the switch will wait for a full maximum transmission unit (MTU) size packet to depart the port before transmitting the XOFF message. In other words, if the port has just initiated transmission of a Jumbo packet before the flow control message is generated, then the delay will be equal to the time that it takes to complete transmission of the Jumbo packet. Thus, even though the average waiting time is about half of a Jumbo packet, the worst worst-case-situation results in a waiting time of a full Jumbo packet.

One example of when this worst-case situation occurs is during benchmark testing for switches. Under these benchmark tests, all ingress ports transmit traffic to a single egress port causing simultaneous congestion on all ingress ports. At the same time one ingress port sends multicast Jumbo frames to all egress ports. Therefore, it is possible that the waiting time for flow-control messages on all ports will be almost equal, and very close to the worst case, during these benchmark tests. For these situations, flow-control triggering events cannot be considered independent events.

In order for a switch to be lossless, headroom has normally been provisioned based on these and other types of worst-case assumptions. However, the worst case scenario is often based on an occurrence of a highly unlikely sequence of events. As such, provisioning the headroom based on these worst case events results in headroom that is unnecessarily large for normal operation.

Current technology and methods are based on dedicated headroom per ingress port and port group. However as the switch sizes (i.e., number of ports, speed of ports, number of lossless priorities) increase, this approach requires larger headroom based on the worst-case-assumptions for each ingress port and port group, thereby resulting in large headroom reservation and low utilization of the switch buffer. Additionally, the flow-control setting is typically based on fixed thresholds which results in synchronization of flow-control setting between different ports and speeds. Another method that is used for controlling the headroom size relies on setting the flow control on every port when the switch memory buffer gets full. This method is very disruptive and can result in throughput degradation and unfair flow controlling of a port.

The various embodiments of the invention provide mechanisms to reduce headroom size while minimizing dropped packets. In general, this is done by using a shared headroom space between all ports, and providing a randomized delay in transmitting the XOFF message. In particular, in one embodiment, a pseudo-random threshold is inserted for triggering the flow control on ports. The randomized flow control offset causes triggering of the flow control on ports to become sufficiently uncorrelated. Thus, headroom sizing can be done based on the average waiting time for the transmission of the XOFF message from the switch, rather than worst case assumptions.

To reduce the required headroom size and to size the headroom based on the average waiting time in the switch rather than the worst case, one embodiment of the invention provides for a shared headroom space between all ports and lossless priorities. The shared headroom efficiency and advantage over dedicated headroom for (ingress port, priorities) are based on a premise that delay in transmission of flow-control messages for each port after the flow control is triggered is a random variable that depends on waiting until transmission of the packet from that port is finished. If the time to set the flow control for different ports and priorities are uncorrelated (or have low correlation), then the required headroom sizes for different ports and priorities can be considered uncorrelated.

With this said, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram of one embodiment of a buffer having a randomized flow-control threshold. Specifically, the embodiment of FIG. 1 shows a buffer 110, an upper threshold 130, labeled as a deterministic threshold (XOFF_DETERMINISTIC), a randomized offset 150 (XOFF_RAND_OFFSET), and a lower threshold 140 that is derived from the XOFF_RAND_OFFSET 150 being subtracted from the XOFF_DETERMINISTIC 130. The XOFF_DETERMINISTIC 130 is derived the same way that a conventional XOFF threshold is computed in current switches. The randomized XOFF_RAND_OFFSET 150 is derived using a pseudo-random number generator and its range is from zero to one maximum transmission unit (MTU). The random component is initially computed per ingress port and priority, and uploaded. Thereafter, a newly-generated random number is uploaded every time that the ingress port priority resets the flow control. Therefore, in this particular embodiment, the flow control is always set based on a newly-selected random number. In the embodiment of FIG. 1, as additional frames or data 120 enter the buffer 110, the buffer usage increases. And, as the buffer usage exceeds the lower threshold 140, the switch generates and transmits the XOFF message to the data source. In this way, the flow control setting events on different ports are not synchronized. Furthermore, there is no fixed bias among ports since the offset is randomly selected for each ingress port and port group after it is used once.

Figure 2:
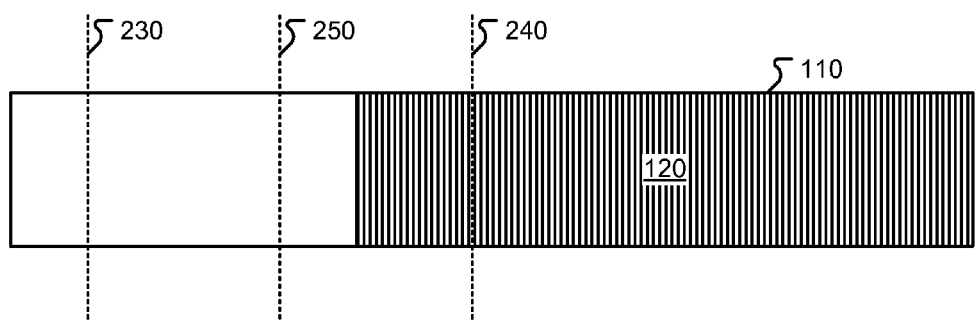
FIG. 2 is a diagram of another embodiment of a buffer having a different randomized flow-control threshold.

FIG. 2 is a diagram of another embodiment of a buffer having a different randomized flow-control threshold. The embodiment of FIG. 2 is based on having two XOFF thresholds: XOFF_MIN 240 and XOFF_MAX 230. The flow control signal is set based on the buffer usage of an ingress port and priority using the following rules. First, if the buffer usage is below XOFF_MIN 240, then flow control is not set. In other words, the flow-control message is never transmitted when data 120 in the buffer 110 is below XOFF_MIN. Second, if the buffer usage is above XOFF_MAX 230, then flow control is set with a probability of one. Stated differently, the flow-control message is always transmitted when data 120 in the buffer 110 exceeds XOFF_MAX 240. Last, if the buffer usage is at a threshold 250 that is between XOFF_MIN 230 and XOFF_MAX 240, then the flow control is set with a probability (which, for some embodiments can be a fixed probability, while for other embodiments can be a variable probability). As such, one can see that the probability of triggering a transmission of the flow-control message ranges from zero to one for each buffer 110.

In comparison, the embodiment of FIG. 2, the switch generates a pseudo-random number for ever cell arrival when the buffer usage is between XOFF_MIN 230 and XOFF_MAX 240. However, in the embodiment of FIG. 1, the switch subtracts the XOFF_RAND_OFFSET 150 from XOFF_DETERMINISTIC 130 for every cell arrival.

Figure 3:
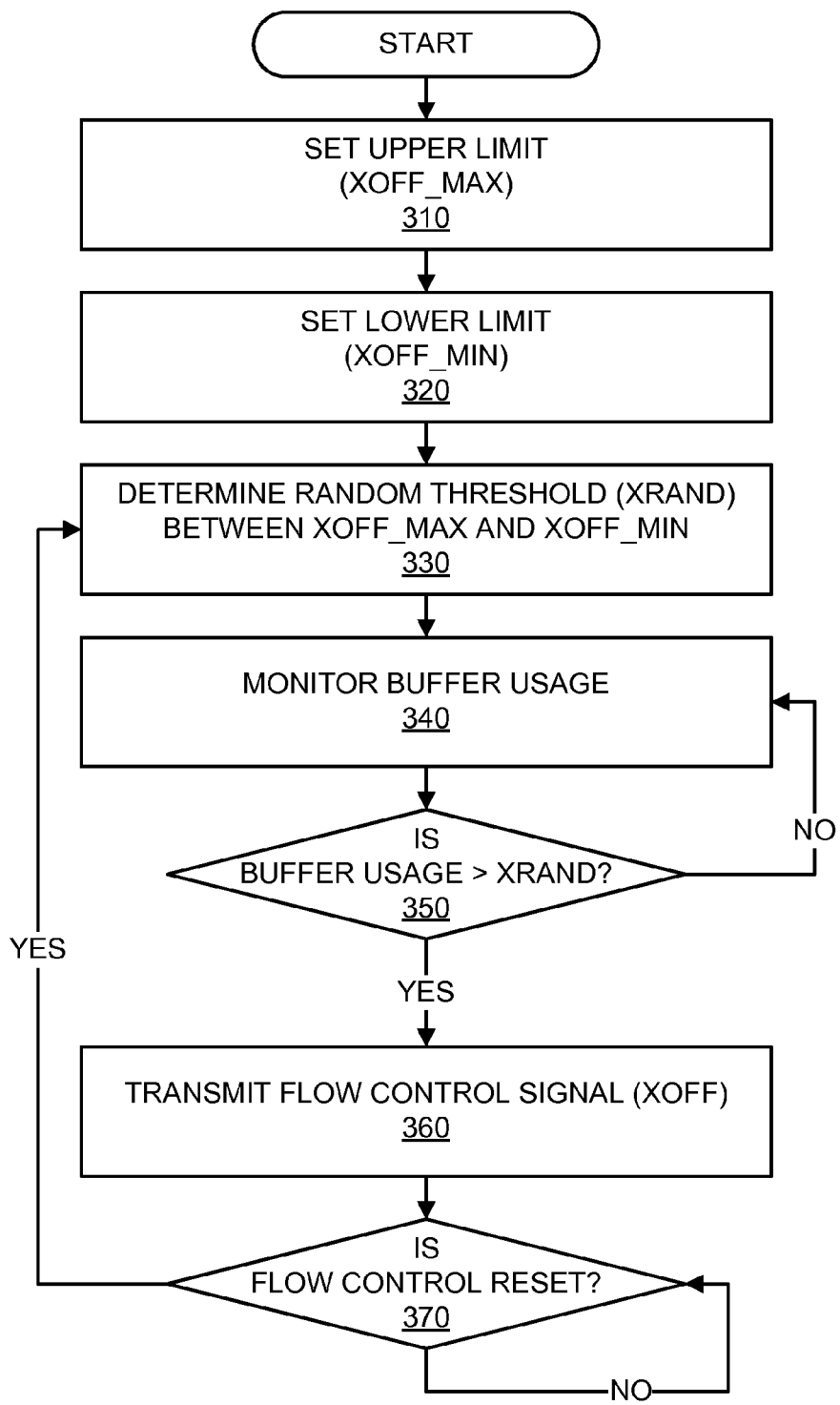
FIG. 3 is a flowchart showing one embodiment of a method for transmitting a flow-control signal.
Figure 4:
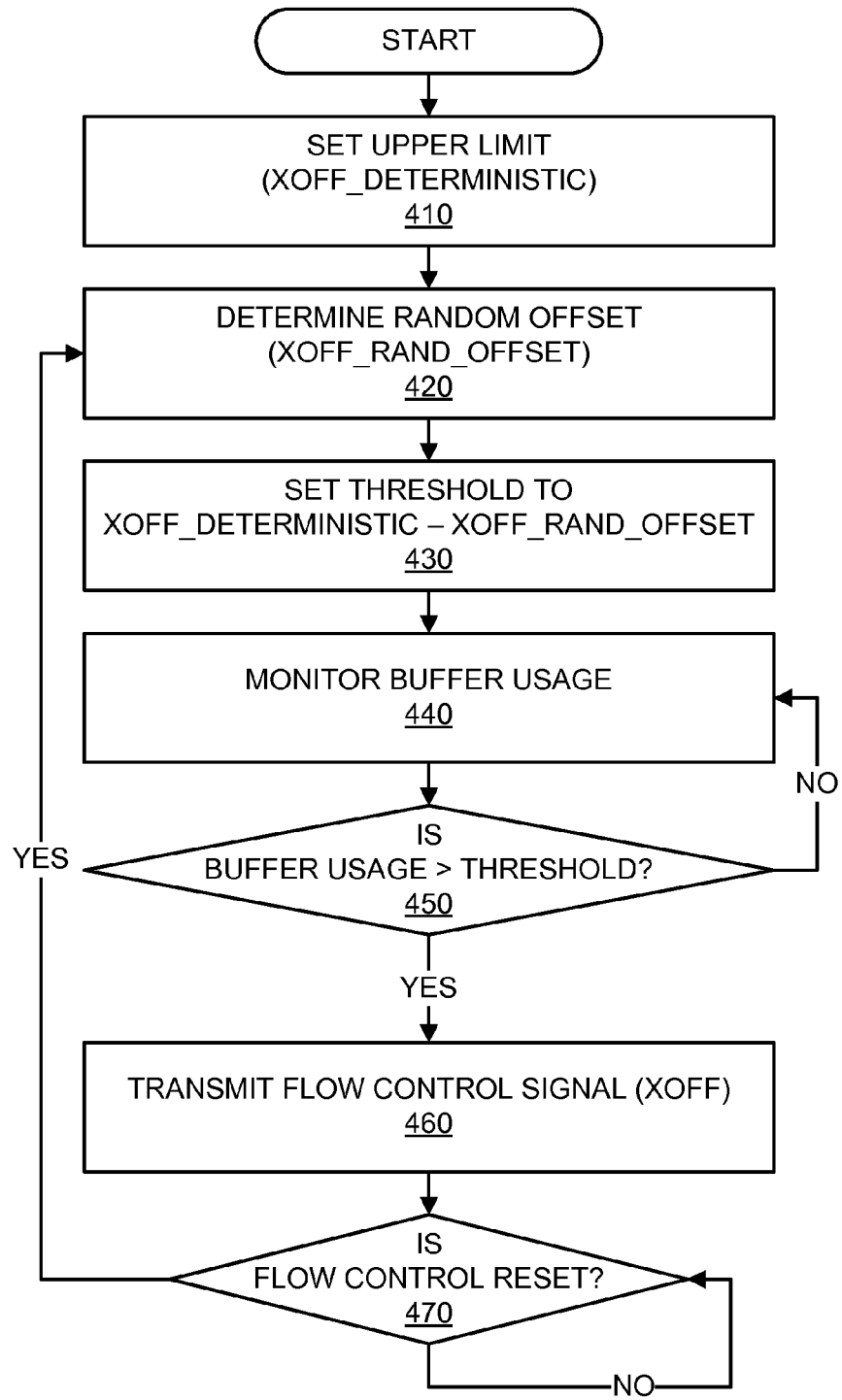
FIG. 4 is a flowchart showing another embodiment of a method for transmitting a flow-control signal.

Various embodiments of the invention can also be viewed as methods, for which two embodiments are shown with reference to FIG. 3 and FIG. 4. As shown in FIG. 3, one embodiment of the method begins with the switch setting 310 an upper limit (XOFF_MAX), and also setting 320 a lower limit (XOFF_MIN). The switch then determines 330 a random threshold (XRAND) that resides between XOFF_MIN and XOFF_MAX. Once the threshold is determined 330, the switch monitors 340 buffer usage and determines 350 whether the buffer usage exceeds XRAND. As long as the buffer usage does not exceed XRAND, the switch continues to monitor 340 buffer usage as packets flow in and out of the buffer. If, however, the buffer usage exceeds XRAND, then the switch transmits 360 a flow-control signal (XOFF), and waits until the flow-control is reset 370. Once the flow control is reset, the switch again determines 330 a random threshold and monitors 340 the buffer usage.

FIG. 4 is a flowchart showing another embodiment of a method for transmitting a flow-control signal. As shown in FIG. 4, this embodiment begins by setting 410 an upper limit (XOFF_DETERMINISTIC), and determining 420 a random offset (XOFF_RAND_OFFSET). Thereafter, a buffer threshold is set 430 to a value that is XOFF_RAND_OFFSET subtracted from XOFF_DETERMINISTIC. The switch monitors 440 buffer usage as packets flow into and out of the buffer, and determines 450 whether or not the buffer usage exceeds the set 430 threshold. If the buffer usage does not exceed the set 430 threshold, then the switch continues to monitor 440 the buffer usage. When the buffer usage exceeds the set 430 threshold, the switch transmits 460 a flow-control signal. Thereafter, the switch waits until the flow control is reset 470, at which time the switch again determines 420 a new random offset, and sets 430 a new threshold based on the random offset.

Figure 5:
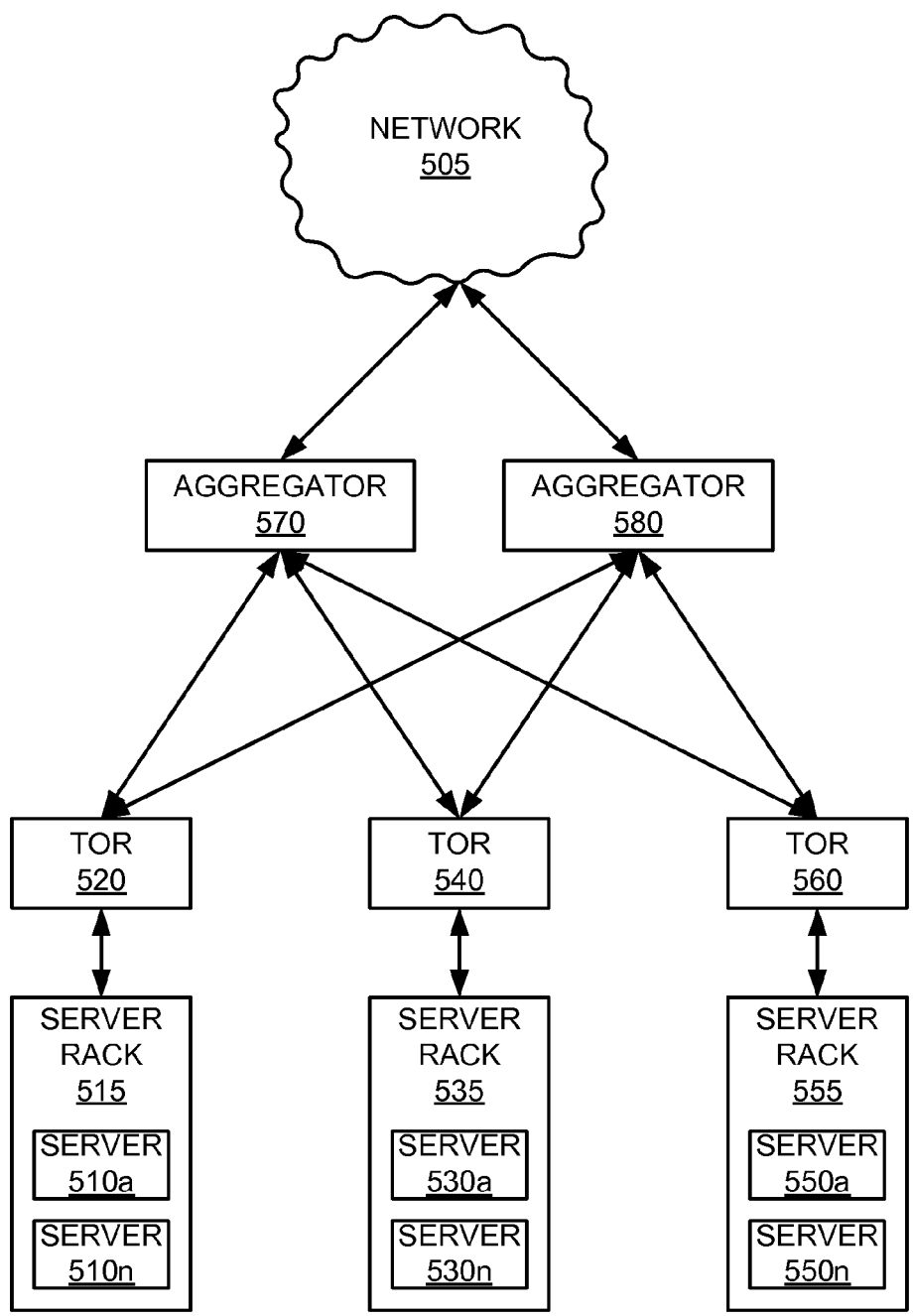
FIG. 5 is a diagram showing one embodiment of a packet-switching architecture, which may employ the buffers of FIGS. 1 and 2.

FIG. 5 is a diagram showing one embodiment of a packet-switching architecture, which can employ the buffers of FIGS. 1 and 2, or employ the methods of FIGS. 3 and 4. As shown in FIG. 5, the packet-switching architecture includes a plethora of components that are operatively coupled to a network 505 (e.g., the Internet). In some embodiments, the architecture includes multiple server racks 515, 535, 555, each having a bank of servers 510a ... 510n (collectively 510), 530a ... 530n (collectively 530), 550a ... 550n (collectively 550). Each server rack 515, 535, 555 is operatively coupled to its respective top-of-the-rack (TOR) switch 520, 540, 560, which allows the servers 510, 530, 550 to transmit and receive data packets through their respective TOR switches 520, 540, 560. The TOR switches 520, 540, 560 are, in turn, operatively coupled to aggregators 570, 580, which allow the TOR switches 520, 540, 560 to access the network 505 through the aggregators 570, 580. Each switch includes one or more buffers, such as those shown in FIG. 1 or 2.

Insofar as each TOR switch 520, 540, 560 has access to both of the aggregators 570, 580, data packets from one server 550a can reach another server 550n through many different circuitous paths. For example, data packets can travel from an originating server 550a, through its TOR switch 520, then through one of the aggregators 570, to another TOR switch 560, eventually arriving at an endpoint server 550n. Alternatively, the data packet can travel from the originating server 550a, through its TOR switch 520, then through another aggregator 580, to the other TOR switch 560, to arrive at the endpoint server 550n. Given that the data traffic through the switches can be enormous, the reduction in headroom, which can be accomplished by employing the buffers as shown in FIG. 1 or 2, can be quite significant.

As one can see from the embodiments of FIGS. 1 through 4, the various embodiments of the invention provide for shared headroom to reduce the memory required for lossless switches. Additionally, the disclosed embodiments have the advantage of provisioning the headroom in a way that is based on an average waiting time to transmit the flow control message, rather than on a worst-case-situation. Also, for some embodiments, the flow control can be set incrementally, if the shared headroom is getting full to reduce the frequency of setting the flow control when there is short term congestion. Additionally, the proposed mechanisms are simple and are amenable to hardware implementation. Furthermore, the number of new attributes in the switch that should be set are limited and are easy to provide guidance to the users and customers.

The randomized threshold may be implemented in hardware, software, firmware, or a combination thereof. In the preferred embodiment(s), the randomized threshold is implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the randomized threshold is implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. For example, multiple parallel implementations of the different embodiments can exist in a switch for the different entities that set the flow control (e.g., queues, ingress ports, etc.). Furthermore, it should be appreciated that multiple, shared headroom can be employed in a switch. For example, one shared headroom can be used for low-priority traffic, while another shared headroom can be used for high-priority traffic. All such changes, modifications, and alterations should therefore be seen as within the scope of the disclosure.

What is claimed is:

1. A method for a switch that receives packets in a packet-switching network, the method comprising:
   setting an upper (XOFF_MAX) threshold for a buffer that shares headroom between a plurality of ports in the switch, the XOFF_MAX threshold indicating a buffer usage that always triggers a transmission of a flow-control (XOFF) message;
   setting a lower (XOFF_MIN) threshold for the buffer, the XOFF_MIN threshold indicating a buffer usage that never triggers the transmission of the XOFF message;
   determining a random (XRAND) value for each port and priority of the switch, each XRAND value being between the XOFF_MAX threshold and the XOFF_MIN threshold;
   monitoring usage of the buffer to determine whether the buffer usage exceeds the XRAND value of a particular port;
   transmitting the XOFF message to a data source that sends packets to the particular port when the buffer usage exceeds the XRAND value of the particular port; and
   when the XOFF message is transmitted, wait a predetermined period of time before determining a new XRAND value for the particular port, wherein
   the XOFF message instructs the data source to pause transmission of the data packets to the switch.

2. A system, comprising:
   a switch that includes a plurality of ports, a buffer that shares headroom between each of the plurality of ports and circuitry, the circuitry configured to
   set an upper (XOFF_MAX) threshold for the buffer, the XOFF_MAX threshold indicating a buffer usage that always triggers a transmission of a flow-control (XOFF) message;
   set a lower (XOFF_MIN) threshold for the buffer, the XOFF_MIN threshold indicating a buffer usage that never triggers the transmission of the XOFF message;
   determine a random (XRAND) value for each port and priority of the switch, each XRAND value being between the XOFF_MAX threshold and the XOFF_MIN threshold;
   monitor usage of the buffer to determine whether the buffer usage exceeds the XRAND value of a particular port;
   transmit the XOFF message to a data source that sends packets to the particular port when the buffer usage exceeds the XRAND value of the particular port; and
   when the XOFF message is transmitted, wait a predetermined period of time before determining a new XRAND value for the particular port, wherein
   the XOFF message instructs the data source to pause transmission of the data packets to the switch.

3. The system according to claim 2, wherein the XRAND value is determined by subtracting a random offset from the XOFF_MAX threshold.

4. The system according to claim 2, wherein
   the XRAND value is determined by adding a random offset to the XOFF_MIN threshold, and
   the XRAND value is between the XOFF_MIN threshold and the XOFF_MAX threshold.

5. The method according to claim 1, wherein the XRAND value is determined by subtracting a random offset from the XOFF_MAX threshold.

6. The method according to claim 1, wherein the XRAND value is determined by adding a random offset to the XOFF_MIN threshold.

7. The method according to claim 1, wherein
   the data source transmits packets to a destination device via the particular port of the switch,
   the data source receives the XOFF message from the switch, and
   after reception of the XOFF message from the switch the data source changes a transmission route of the packets to the destination device so that the packets do not pass through the switch.

8. The method according to claim 7, wherein, after at least the predetermined period of time, the data source redirects the transmission route of the packets to the destination device so that the packets again pass through the switch.

9. The method according to claim 1, wherein a flow control of the buffer is based on a most recent selected XRAND value.

10. The method according to claim 1, wherein the XRAND value for each of the plurality of ports is different.

11. The system according to claim 2, further comprising the data source, wherein
    the data source transmits packets to a destination device via the particular port of the switch,
    the data source receives the XOFF message from the switch, and
    after reception of the XOFF message from the switch, the data source changes a transmission route of the packets to the destination device so that the packets do not pass through the switch.

12. The system according to claim 11, wherein, after at least the predetermined period of time, the data source redirects the transmission route of the packets to the destination device so that the packets again pass through the switch.

13. The system according to claim 2, wherein a flow control of the buffer is based on a most recent selected XRAND value.

14. The system according to claim 2, wherein the XRAND value for each of the plurality of ports is different.

15. A method for a switch that includes a buffer and a plurality of ports, the buffer sharing headroom between the plurality of ports in the switch, the method comprising:
   determining a random (XRAND) value for each port and priority of the switch, each XRAND value being a threshold for the buffer of the switch;
   monitoring usage of the buffer to determine whether the buffer usage exceeds the XRAND value of a particular port;
   transmitting a flow-control (XOFF) message to a data source that sends packets to the particular port when the buffer usage exceeds the XRAND value of the particular port; and
   when the XOFF message is transmitted, wait a predetermined period of time before determining a new XRAND value for the particular port, wherein
   the XOFF message instructs the data source to pause transmission of the data packets to the switch.

* * * * *